(12) United States Patent
Steinbuch et al.

(10) Patent No.: US 10,591,585 B2
(45) Date of Patent: Mar. 17, 2020

(54) ELECTRONIC CONTROL UNIT FOR RADAR SENSORS

(71) Applicant: Robert Bosch GmbH, Stuttgart (DE)

(72) Inventors: Dirk Steinbuch, Wimsheim (DE); Matthias Steinhauer, Steinheim (DE); Michael Ott, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 375 days.

(21) Appl. No.: 15/524,549

(22) PCT Filed: Sep. 18, 2015

(86) PCT No.: PCT/EP2015/071422
§ 371 (c)(1),
(2) Date: May 4, 2017

(87) PCT Pub. No.: WO2016/078799
PCT Pub. Date: May 26, 2016

(65) Prior Publication Data
US 2017/0315214 A1    Nov. 2, 2017

(30) Foreign Application Priority Data

Nov. 18, 2014  (DE) .................. 10 2014 223 469

(51) Int. Cl.
*G01S 13/93*    (2006.01)
*G01S 7/40*    (2006.01)
(Continued)

(52) U.S. Cl.
CPC .............. *G01S 7/4017* (2013.01); *G01S 7/03* (2013.01); *G01S 7/032* (2013.01); *G01S 7/4004* (2013.01);
(Continued)

(58) Field of Classification Search
CPC .. G01S 13/931; G01S 2013/9357; G01S 7/03; G01S 7/032; G01S 7/4004; G01S 7/4008; G01S 7/4017; G01S 7/4021
(Continued)

(56) References Cited

U.S. PATENT DOCUMENTS 3,383,678 A    5/1968  Palmer
5,408,089 A *  4/1995  Bruno ...................... G01V 8/20
                                                          250/221
(Continued)

FOREIGN PATENT DOCUMENTS

CN    2446612 Y    9/2001
CN    101303383 A   11/2008
(Continued)

OTHER PUBLICATIONS

International Search Report for PCT/EP2015/071422, dated Jan. 4, 2016.

*Primary Examiner* — Timothy A Brainard
(74) *Attorney, Agent, or Firm* — Norton Rose Fulbright US LLP; Gerard Messina

(57) ABSTRACT

An electronic control unit for radar sensors, in particular for driver assistance systems in motor vehicles, including an integrated component for generating and processing high-frequency signals, and a controller for controlling functions of this component, including monitoring functions for monitoring the operability of the radar sensor, characterized by an error injector integrated into the component for generating defined error conditions for a functional test of the monitoring functions.

10 Claims, 5 Drawing Sheets

(51) Int. Cl.
*G01S 13/931* (2020.01)
*G01S 7/03* (2006.01)

(52) U.S. Cl.
CPC .......... *G01S 7/4008* (2013.01); *G01S 7/4021* (2013.01); *G01S 13/931* (2013.01); *G01S 2013/9322* (2020.01)

(58) Field of Classification Search
USPC ........................................................ 342/168
See application file for complete search history.

(56) References Cited

U.S. PATENT DOCUMENTS

| | | | |
|---|---|---|---|
| 6,198,416 B1* | 3/2001 | Velazquez | H03M 1/0614 |
| | | | 341/118 |
| 6,570,514 B1* | 5/2003 | Velazquez | H03M 1/1052 |
| | | | 341/118 |
| 6,580,386 B1* | 6/2003 | Aker | G01S 7/06 |
| | | | 342/104 |
| 9,360,549 B1* | 6/2016 | Liu | H01Q 3/267 |
| 2014/0210670 A1* | 7/2014 | Weber | G01F 23/284 |
| | | | 342/385 |

FOREIGN PATENT DOCUMENTS

| | | |
|---|---|---|
| CN | 201392380 Y | 1/2010 |
| DE | 102012201990 A1 | 8/2013 |
| EP | 2911027 A2 | 8/2015 |
| JP | S5714292 | 1/1982 |
| JP | S6054096 A | 3/1985 |
| JP | S61501230 A | 6/1986 |
| JP | S62233773 A | 10/1987 |
| WO | 2013062691 A1 | 5/2013 |

\* cited by examiner

ELECTRONIC CONTROL UNIT FOR RADAR SENSORS

FIELD OF THE INVENTION

The present invention relates to an electronic control unit for radar sensors, in particular for driver assistance systems in motor vehicles, including an integrated component for generating and processing high-frequency signals, and a controller for controlling functions of this component, including monitoring functions for monitoring the operability of the radar sensor.

BACKGROUND INFORMATION

Radar sensors are increasingly used for safety-relevant assistance functions in motor vehicles, for example, for an adaptive cruise control and/or for collision warning or collision avoidance systems. Since malfunctions of the radar sensor may have serious consequences in these applications, it is essential to closely monitor the operability of the radar sensor. For this reason, monitoring routines are provided in known control units, with which it is possible to constantly or periodically monitor essential functions of the radar sensor and the control unit during operation, such that the control unit has a certain self-diagnostic capability.

Prior to the initial operation of the radar sensor, the monitoring functions should also be subjected to a functional test in order to ensure that the monitoring functions correctly detect the error conditions that they are to monitor, and that the control unit reacts appropriately to the detected errors, for example, with a partial or complete automatic shutdown, output of error signals, and the like.

Typically, near-series radar sensors and associated control units are used for the functional test of the monitoring functions, and errors are injected into the system via external modifications. The software of the control unit must detect these errors and initiate corresponding measures. This error reaction is then observed and evaluated during the test.

In the electronic control units for radar sensors, integrated high-frequency components, so-called MMICs (Monolithic Microwave Integrated Circuit) are increasingly used. Such MMICs may contain the entire high-frequency part for multiple transmission and receiver channels of the radar sensor, and additionally contain an integrated controller (microcontroller) for controlling the individual components of the MMICs and for controlling the data traffic using a higher-level external controller. While the highly integrated structure has numerous advantages, it causes difficulties if internal error conditions need to be generated in the MMICs for the functional test.

While it is possible, in principle, with the aid of specialized software to generate such error conditions, the functional tests must be carried out in close to real-world conditions, in particular using the released series software, in which certain modifications, which would support carrying out the functional tests, are not permissible.

In known methods for carrying out the functional tests, signal lines and/or programming lines on the circuit board of the MMIC are contacted with needle adapters in order to falsify output signals in a targeted manner or to manipulate data packets in a targeted manner.

However, it is disadvantageous in these methods that the radar sensor must be disassembled and opened so that access to the lines is obtained. This change of the surroundings may cause corruption of error reactions which do not occur in actual operation. In addition, the disassembly and re-assembly of the radar sensor is time-consuming and labor-intensive, and therefore costly.

SUMMARY OF THE INVENTION

It is therefore the object of the present invention to simplify carrying out meaningful functional tests in control units for radar sensors.

This object is achieved according to the present invention by an error injector integrated into the component for generating defined error conditions for a functional test of the monitoring functions.

According to the present invention, the component (MMIC) is thus itself modified in such a way that it is able to generate well-defined error conditions on the basis of an internal program and/or an external command so that it may be tested during operation of the radar sensor with the permissible series software whether these errors are correctly detected and appropriately treated.

Advantageous configurations and refinements of the present invention are indicated in the subclaims.

The error injector may include circuit components which are provided in the MMIC specifically for the purpose of generating the desired error conditions, for example, through short circuiting, interrupting or damping signal or control lines, generating and injecting noise signals, and the like.

In general, the MMIC will also include an internal controller with which the individual functional components of the high-frequency part may be controlled. In this case, the error injector may be formed completely or partially by a software module that runs on the internal controller and which triggers the error conditions by corresponding control of the components controlled by the controller.

If the monitoring functions are likewise implemented on the internal controller of the MMIC, then this controller may also autonomously carry out a self-test routine in which different error conditions are generated according to a certain program with the aid of the error injector and the controller itself balances the reactions of the monitoring functions activated thereby with corresponding, stored setpoint reactions so that only a status message needs to be output to the external controller indicating that no error is present or what types of errors have been determined.

Such a self-test routine may be activated either by an external command or may be activated automatically under certain circumstances by the internal controller, for example in each case during switching on of the operating voltage (power-up mode of the MMIC). In this case, the necessary adjustments to the series software are limited to the software being able to receive and process status messages or error messages from the MMIC.

In another specific embodiment, the self-test routine may also be activated in that a signal is applied at a port of the MMIC specifically provided for this purpose. This port may be mechanically configured in such a way that it is not easily accessible so that the signal may then only be applied if the radar sensor is partially disassembled. This indeed requires a certain amount of work during the activation of the self-test routine; however, it reduces the risk that the error injection is unintentionally activated by the application of a signal at this free port.

In another specific embodiment, the error injector may be activated by corresponding commands which are generated by the series software. The commands may thereby relate to the activation of preprogrammed error injection sequences or also to the selection and activation of individual error conditions. The necessary adjustments in the series software include solely the addition of an additional software module for the self-tests, which leaves the software for the regular operation of the radar sensor unaffected so that no inadmissible modifications need to be carried out on this software.

The different options for activating the error injector or selected functions of the same are combinable with one another. In one specific embodiment, the error injector allows the injection of at least one error for each implemented monitoring function with which this monitoring function may be tested.

In the following, exemplary embodiments will be described in greater detail based on the drawings.

DETAILED DESCRIPTION

Figure 1:
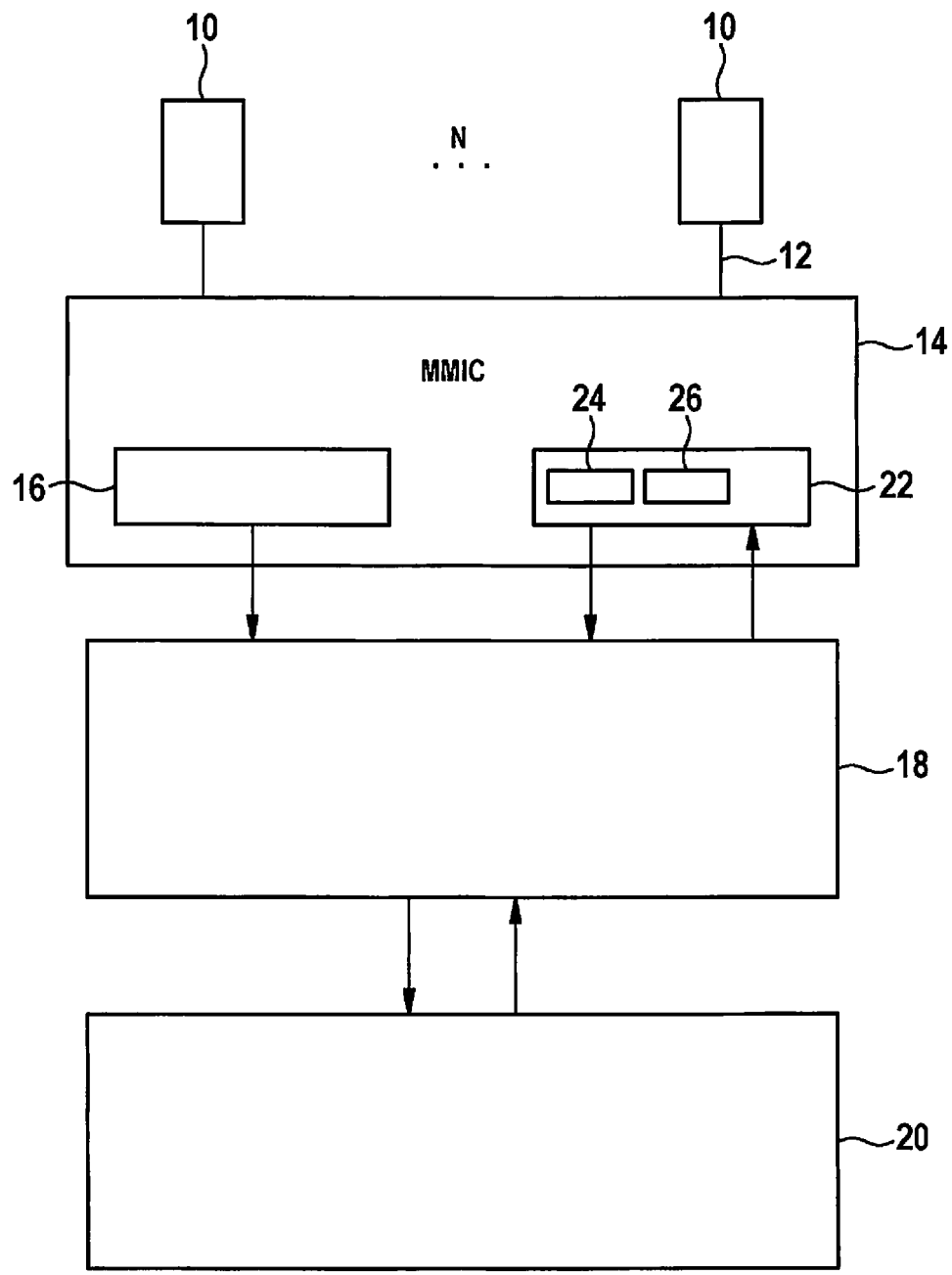
FIG. 1 shows a block diagram of a radar sensor including an associated control unit.

FIG. 1 schematically shows an angle-resolving radar sensor for a motor vehicle which includes N antenna elements 10 situated next to one another which are connected to an integrated component 14 (MMIC) via high-frequency lines 12, for example microstrips or waveguides. Antenna elements 10 or at least some of them are operable both as transmitting antennas for transmitting radar signals and as receiving antennas for receiving the radar echoes. As an example, it should be assumed that the radar sensor is an FMCW radar (Frequency-Modulated Continuous-Wave), in which the frequency of the signals emitted by antenna elements 10 is modulated in a ramp-like manner and the received radar echoes are each mixed with a part of the transmission signal so that a baseband signal with significantly lower frequency is obtained whose (complex) amplitude contains information about the distance and the relative speed of the located object. In addition, the azimuth angle of the located object may be at least estimated by way of phase and/or amplitude differences between the signals received by different antenna elements 10.

Integrated component 14, subsequently referred to as MMIC, contains the entire high-frequency electronics for all transmission and receiver channels, thus for all N antenna elements 10, and it additionally contains an integrated digital baseband signal processing stage 16 which outputs digitized and suitably conditioned baseband signals to an external controller 18. Controller 18 uses a fast Fourier Transformation to determine the spectra of the respectively recorded baseband signals for a frequency ramp and from this determines the distances, relative speeds, and azimuth angles of the located objects. This information is then transmitted to a driver assistance system 20, for example, a collision warning system.

Driver assistance system 20 may for its part influence the operability of the radar sensor through commands to external controller 18.

The MMIC contains an internal control unit 22 which controls different functional components of the MMIC and communicates with external controller 18 via a digital interface. In this way, external controller 18 may transmit commands to the MMIC which are then implemented by internal control unit 22 of the MMIC.

Internal control unit 22 contains a monitoring module 24 as a subunit which monitors the states and functions of various functional components of the MMIC and may transmit corresponding status messages to external controller 18.

Furthermore, internal control unit 22 includes an error injector 26 with which it is possible to trigger previously defined internal error conditions in the MMIC. In this way it is also possible to subject monitoring module 24 to a functional test in that targeted error conditions are caused with the aid of the error injector and it is then checked whether these errors are detected by monitoring module 24 or the higher-level software.

Figure 2:
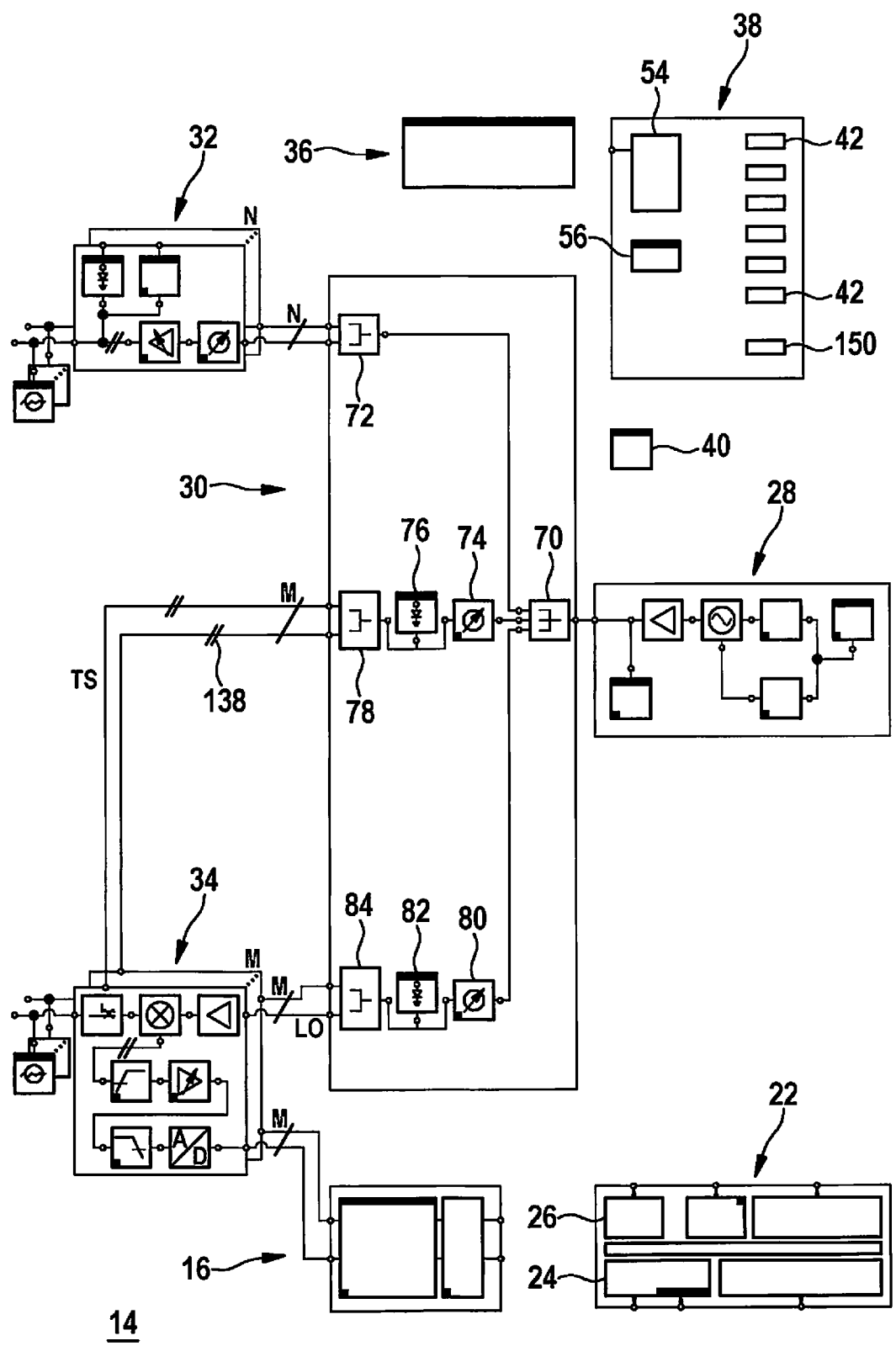
FIG. 2 shows a block diagram of an MMIC which forms an essential component of the control unit of the radar sensor according to FIG. 1.

The essential subsystems of MMIC 14 are depicted as a block diagram in FIG. 2.

A signal generator 28 supplies a high-frequency signal which is divided by a signal distributor 30 and forwarded to multiple system components, among them a transmitting part 32. Transmitting part 32 has N parallel channels which supply N antenna elements 10 so that the high-frequency signal is emitted as a radar signal via these antenna elements.

A receiving part 34 has M channels for processing the radar echoes received by antenna elements 10. In each channel, the received signal is mixed with a local oscillator signal LO which is provided by signal distributor 30 and corresponds to the high-frequency signal generated by signal generator 28. By mixing these signals, a baseband signal is obtained in each case whose frequency corresponds to the frequency difference between the received signal and the local oscillator signal, and lies in a lower frequency band, the baseband. This baseband signal is digitized and output to digital baseband signal processing stage 16.

In addition to the components described above and internal control unit 22, MMIC 14 also includes a clock signal generator 36, an interface unit 38, and an integrated temperature sensor 40.

Clock signal generator 36 generates various clock signals, synchronized to one another, which are required by the various system components.

Interface unit 38 includes various input and output ports 42, via which the MMIC communicates with external controller 18 and, if necessary, other components, e.g., other MMICs.

Interface unit 38 additionally contains a voltage supply module 54 including multiple voltage regulators, which provide regulated operating voltages for the remaining functional components of the MMIC, and a voltage monitoring block 56 for monitoring the output operating voltages.

With the aid of temperature sensor 40, it is monitored whether the temperature of the MMIC lies within a permissible range.

Figure 3:
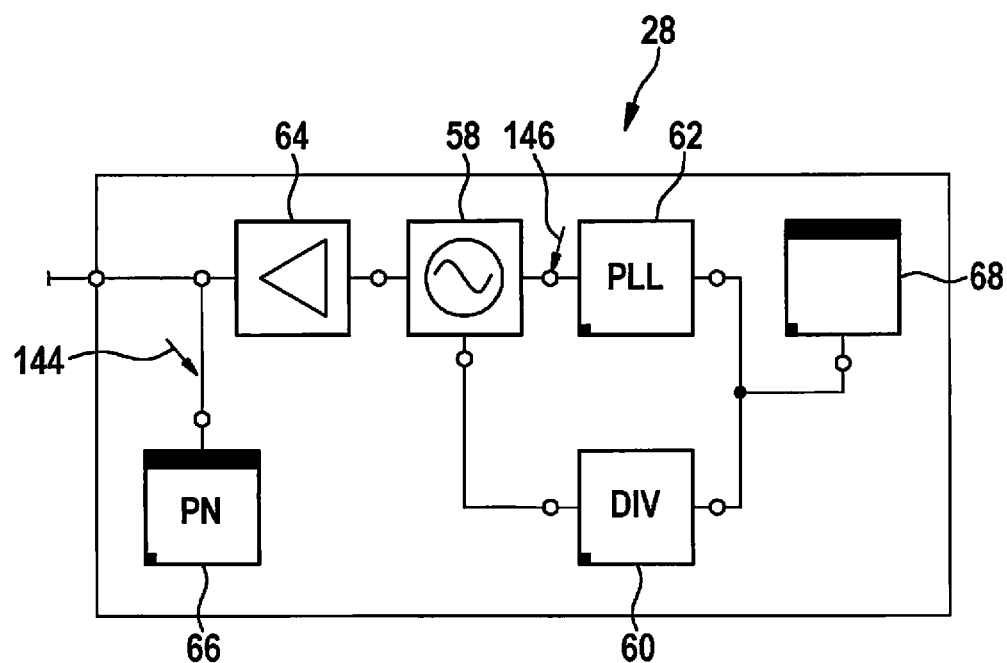
FIG. 3 shows an individual depiction of a signal generator in the MMIC according to FIG. 2.

Signal generator 28 is shown again separately in FIG. 3 and includes a voltage-regulated local oscillator 58, a frequency divider 60, and a phase-locked loop 62 (PLL), with which the frequency and phase of the output signal of the oscillator are regulated in a closed loop.

The output signal of the oscillator is amplified in an amplifier 64 and output to signal distributor 30 (FIG. 2). A noise detector 66 monitors phase noise at the output of amplifier 64, and a phase detector 68 monitors the phase lock of the PLL.

Signal distributor 30 (FIG. 2) includes a first distributor stage 70 which divides the high-frequency signal provided by signal generator 28 into a transmitting branch for transmitting part 32, a test signal branch, and an LO branch for receiving part 34. The transmitting branch includes another distributor stage 72 for dividing the signal to be sent to the N channels of transmitting part 32. The test signal branch includes an IQ modulator 74, with which the phase of the signal may be shifted and the frequency may also be changed at continuous phase shift, a power sensor 76, and a distributor stage 78 for dividing the high-frequency signal into test signals TS for the M channels of receiving part 34.

The LO branch, which provides local oscillator signals LO for the four channels of receiving part 34, correspondingly includes an IQ modulator 80, a power sensor 82, and a distributor stage 84.

Figure 4:
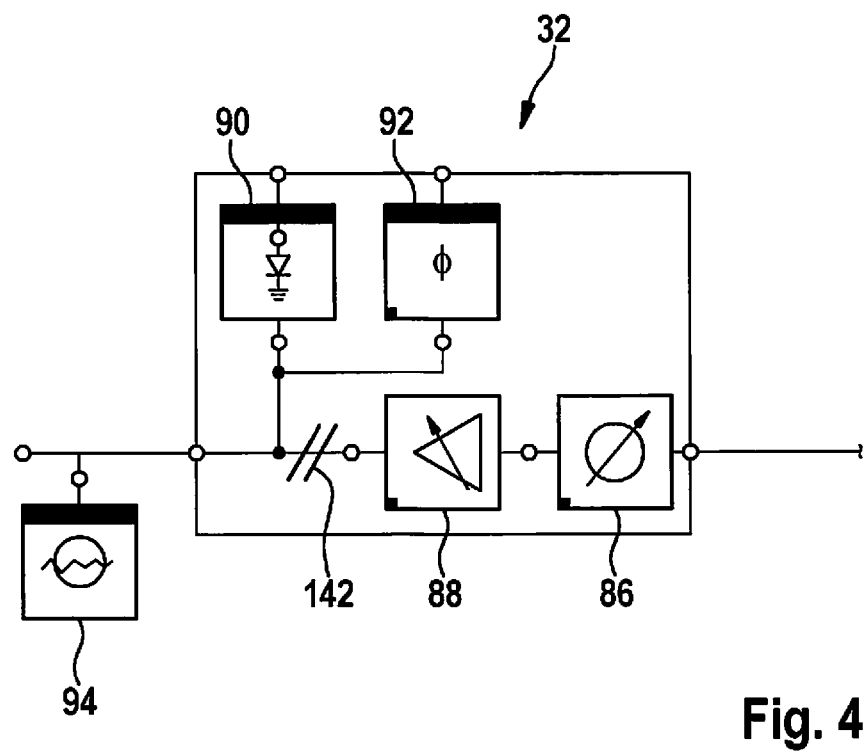
FIG. 4 shows an individual depiction of a transmitting part in the MMIC.

A single channel of transmitting part 32 is shown separately in FIG. 4 and includes another IQ modulator 86, a controllable amplifier 88, a power sensor 90, and a phase sensor 92.

In a typical mechanical structure of the radar sensor, MMIC 14 is mounted on a circuit board (not shown) on which strip conductors are located to transmit the high-frequency signals between the MMIC and antenna elements 10. The electrical contact between the MMIC and these strip conductors are produced via solder balls which are exposed to substantial mechanical stress caused by mechanical shocks during use of the radar sensor in a motor vehicle, and therefore need to be particularly monitored. For this reason, a contact tester 94 is assigned to each channel of transmitting part 32 to monitor the electrical contact at the relevant solder ball. The monitoring may be carried out, for example, in that a direct voltage is applied to the corresponding line, and it is checked whether a corresponding direct current flows through the line. It this is not the case, this indicates that the contact at the solder ball is interrupted.

Figure 5:
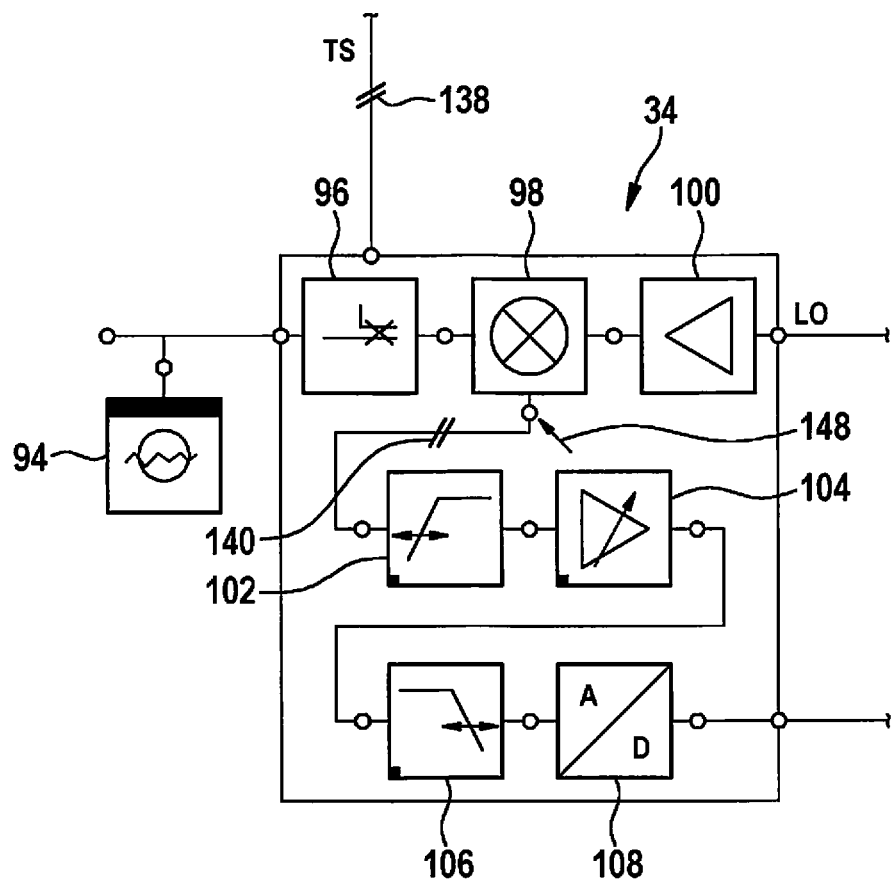
FIG. 5 shows an individual depiction of a receiving part in the MMIC.

Corresponding contact testers 94 are also assigned to each input channel of receiving part 34, of which one is shown separately in FIG. 5. The high-frequency input of each channel is connected via a coupler 96 to a mixer 98, to which local oscillator signal LO is also guided via an amplifier 100. The mixed product is forwarded via a high-pass filter 102, a controllable amplifier 104, and a low-pass filter 106 to an analog input of an analog-digital converter 108, whose digital output signal is then forwarded to baseband signal processing stage 16, which is shown separately in FIG. 6.

Coupler 96 is used to couple test signal TS into mixer 98 so that the mixer may be subjected to a functional test using a defined test signal that simulates a "real" radar echo received by antenna element 10.

The M digital output signals of receiving part 34 are applied at the input of a baseband conditioning circuit 110 of baseband signal processing stage 16 and are tested there for phase synchronization and amplitude synchronization. Synchronization errors, which may be caused, for example, by aging defects, are corrected if necessary. The conditioned baseband signals are then forwarded in parallel to a LVDS driver 116 and finally transmitted to external controller 18 via one of ports 42 (LVDS port).

Figure 7:
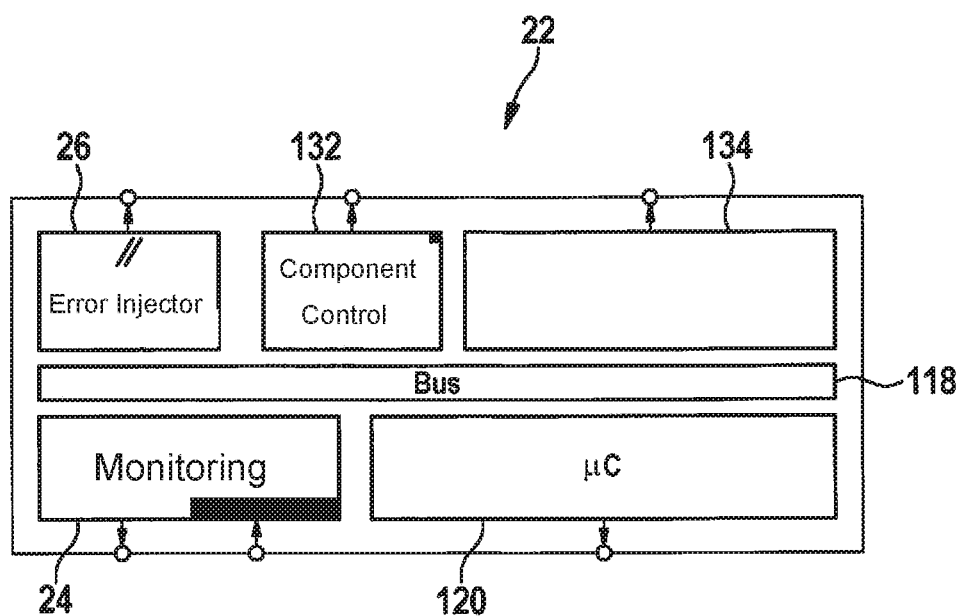
FIG. 7 shows an individual depiction of a control unit in the MMIC.

Internal control unit 22 is shown separately in FIG. 7, and includes a number of functional modules which are configured partially as hardware components and partially as software modules, and communicate with one another via a local bus 118. The key component of the control unit is an internal controller (microcontroller) 120, which executes programs which are stored in a non-volatile memory.

Figure 6:
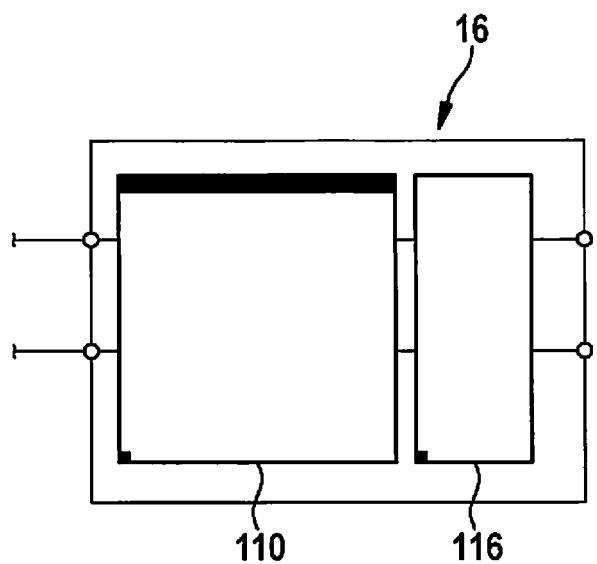
FIG. 6 shows an individual depiction of a digital baseband signal processing stage in the MMIC.

A control module 132 controls a plurality of functional components of the MMIC. The block, which symbolizes control module 132 in FIG. 7, is indicated by a black square in the upper right corner. Correspondingly, the functional blocks which are controlled by this module are indicated in FIGS. 2 through 6 by a black square in the lower left corner. These include, for example, frequency divider 60, PLL 62, noise detector 66, and phase detector 68 of signal generator 28 (FIG. 3), likewise IQ modulators 74 and 80 of signal distributor 30 (FIG. 2), IQ modulators 86, amplifiers 88, and phase detectors 92 of the different channels of transmitting part 32 (FIG. 4), the filters and amplifiers of receiving part 34 (FIG. 5), and baseband conditioning circuit 110 in digital baseband signal processing stage 16 (FIG. 6).

Additional functions and modules of control unit 22 are symbolized in FIG. 7 by a block 134. These may include, for example, a system for error handling and various signal generators which generates various signals required in the MMIC, such as modulation signals for the IQ modulators and the like.

Several of the functional components shown in FIGS. 2 through 6 are used exclusively or among other things to carry out monitoring functions. The blocks which represent these components are identified in FIGS. 2 through 6 by a black bar at the upper edge. Thus, for example, the phase noises and the phase angle of the oscillator signal is monitored in signal generator 28 (FIG. 3) with the aid of detectors 66 and 68. In signal distributor 30, the power levels in the test signal path and in the LO path are monitored with the aid of power sensors 76 and 82. Likewise, power sensors 90 and phase sensors 92 in transmitting part 32 (FIG. 4) monitor the power levels and phases of the transmission signals transmitted to the antenna elements. Contact testers 94 for transmitting part 32 and receiving part 34 and monitoring block 116 in baseband signal processing stage 16 also have monitoring functions, as do temperature sensor 40 and clock signal generator 36 (monitoring the clock signals).

In control unit 22 (FIG. 7), the monitoring signals of all these components are received by monitoring module 24 and checked for accuracy. If an irregular status is determined, then a message is carried out to external controller 18, and, if necessary, an error handling routine may be internally activated in control unit 22 which prompts suitable countermeasures, depending on the type and severity of the error, for example, outputting specific error messages, deactivating certain components and functions, or an automatic shutdown of the entire radar sensor.

It should, however, also be tested at least once prior to the initial operation of the radar sensor whether the monitoring functions function correctly or are defective in themselves. For this purpose, error injector 26 is provided in control unit 22, with which targeted defined error conditions of the MMIC may be triggered so that it may be tested internally within control unit 22 or externally in controller 18 whether the error conditions are detected and correctly handled. For example, a table of each error representable by error injector 26 may be stored for this purpose which indicates which system reactions are to be carried out for this error, and it may then be automatically tested whether the expected reactions actually occur.

Suitable measures for causing the defined error conditions are hardware measures on the one hand and firmware measures on the other hand.

As an example of hardware measures, FIG. 2 shows some switching elements 138 (symbolized by slanted double lines) which are situated in the test signal path and may be directly activated by error injector 26 to interrupt the supply of test signal TS to one or multiple of the mixers in receiving part 34. In this way, the failure of one or multiple mixers may be simulated and then tested whether the error is correctly detected and the error handling routine correctly reacted to. Instead of a line break, a short circuit or a signal damping on the relevant line may also be selectively caused with the aid of corresponding switching elements 138. As an alternative, FIG. 5 also shows switching elements 140 with which the output line of the mixer may be interrupted, short circuited, or damped.

As another example of a hardware measure, FIG. 4 shows a switching element 142 with which the signal in transmitting part 32 may be blocked or damped at the output of amplifier 88. The power level measured by power sensor 90 will thus drop. This allows a test of whether the monitoring of this power level functions correctly in monitoring module 24.

Alternatively, the line, which transmits the output signal from power sensor 90 to monitoring module 24, may also be interrupted, short-circuited, or damped.

When the function of noise sensor 66 in signal generator 28 (FIG. 3) is to be monitored, then a hardware measure for generating an error may include the artificial generation of a noise signal, which may be with the aid of one of the listed signal generators which are already present in the MMIC, and with the aid of a signal injector 144, this noise signal is injected into the line which leads to the input of noise sensor 66. Alternatively, with the aid of a corresponding signal injector 146, a noise signal may be injected into the control voltage input of oscillator 58. This signal injector would simultaneously facilitate a functional test of phase detector 68, so that it may be tested whether the lock status of PLL 62 is correctly monitored.

In corresponding ways, monitoring functions may also be tested which are used for monitoring the noise level in baseband signal processing stage 16.

One example of a firmware measure, for example for testing the monitoring function for monitoring the transmission power, includes error injector 26 prompting control module 132 in a program-controlled manner to control adjustable amplifier 88 in transmitting part 32 (FIG. 4) in such a way that the transmission power is artificially decreased.

In one specific embodiment, in which mixers 98 in receiving part 34 are able to be individually switched off with the aid of control module 134, the monitoring function with which the mixers are monitored might also be tested by a targeted switching off of individual mixers.

Correspondingly, a monitoring function, which monitors the noise level at the output of the mixer, might be tested in that a noise signal, as a mixer test signal, is injected with the aid of a present test signal generator and a signal injector 148.

One firmware measure for testing the function which monitors the lock status of the PLL might include manipulating the status of a register, in which the lock status is filed, in monitoring module 24.

Another monitoring function of monitoring module 24 includes monitoring the LVDS data flow from the MMIC to external controller 18. This monitoring is usually carried out in that a type of checksum is formed with the aid of a CRC coding function (cyclic redundancy check). A firmware measure for generating an artificial error condition might then include manipulating the coefficients of the CRC coding function.

For all components shown in FIGS. 2 through 6 which have a monitoring function, it is generally possible to use hardware or firmware measures (or a combination of the two) to manipulate the output signals which are transmitted to monitoring module 24, and thus to simulate an error condition so that it may then be tested whether the error is correctly detected.

The activation of error injector 26 may be carried out autonomously due to a command generated internally in control unit 22 or due to a command transmitted from outside by external controller 18. An additional possibility is shown symbolically in FIG. 2. A specific test port 150 is shown there in interface unit 38. Applying a signal (a voltage) at this port has the effect that a program is started in error injector 26 with which a predefined sequence of errors is generated, which then facilitate a test of the corresponding monitoring functions.

What is claimed is:

1. An electronic control unit for a radar sensor in a motor vehicle, comprising:
    an integrated component for generating and processing high-frequency signals; and
    a controller for controlling functions of the component, including monitoring functions for monitoring the operability of the radar sensor;
    wherein an error injector is integrated into the component for generating defined error conditions for a functional test of the monitoring functions.

2. The control unit of claim 1, wherein the component includes at least one switching element which is activatable by the error injector and is specifically provided to interrupt, short circuit, or damp a line in the component to generate the error condition.

3. The control unit of claim 1, wherein the component includes at least one signal generator and at least one signal injector which is activatable by the error injector and to inject an interference signal generated by the signal generator into a line of the component.

4. The control unit of claim 1, wherein the component includes an internal control unit to control functional components of the component, and wherein the error injector is configured to prompt the control unit to generate an error condition by corresponding control of at least one functional component.

5. The control unit of claim 1, wherein the error injector is configured to generate a predefined sequence of error conditions upon a test command.

6. The control unit of claim 5, wherein the component includes a specific test port for inputting the test command.

7. The control unit of claim 5, wherein the component includes an internal control unit to autonomously generate the test command for the error injector under predefined circumstances.

8. The control unit of claim 7, wherein the control unit is configured to check the reactions of the monitoring functions to the error conditions generated by the error injector for compliance with predefined setpoint reactions.

9. The control unit of claim 1, further comprising:
    an external controller to control the component and to transmit commands to the error injector.

10. The control unit of claim 1, wherein the electronic control unit is for a radar sensor of a driver assistance system.

* * * * *